Feb. 11, 1969   B. W. PENGILLY   3,427,287
METHOD FOR PREPARING POLYESTER RESINS
Original Filed Aug. 30, 1961
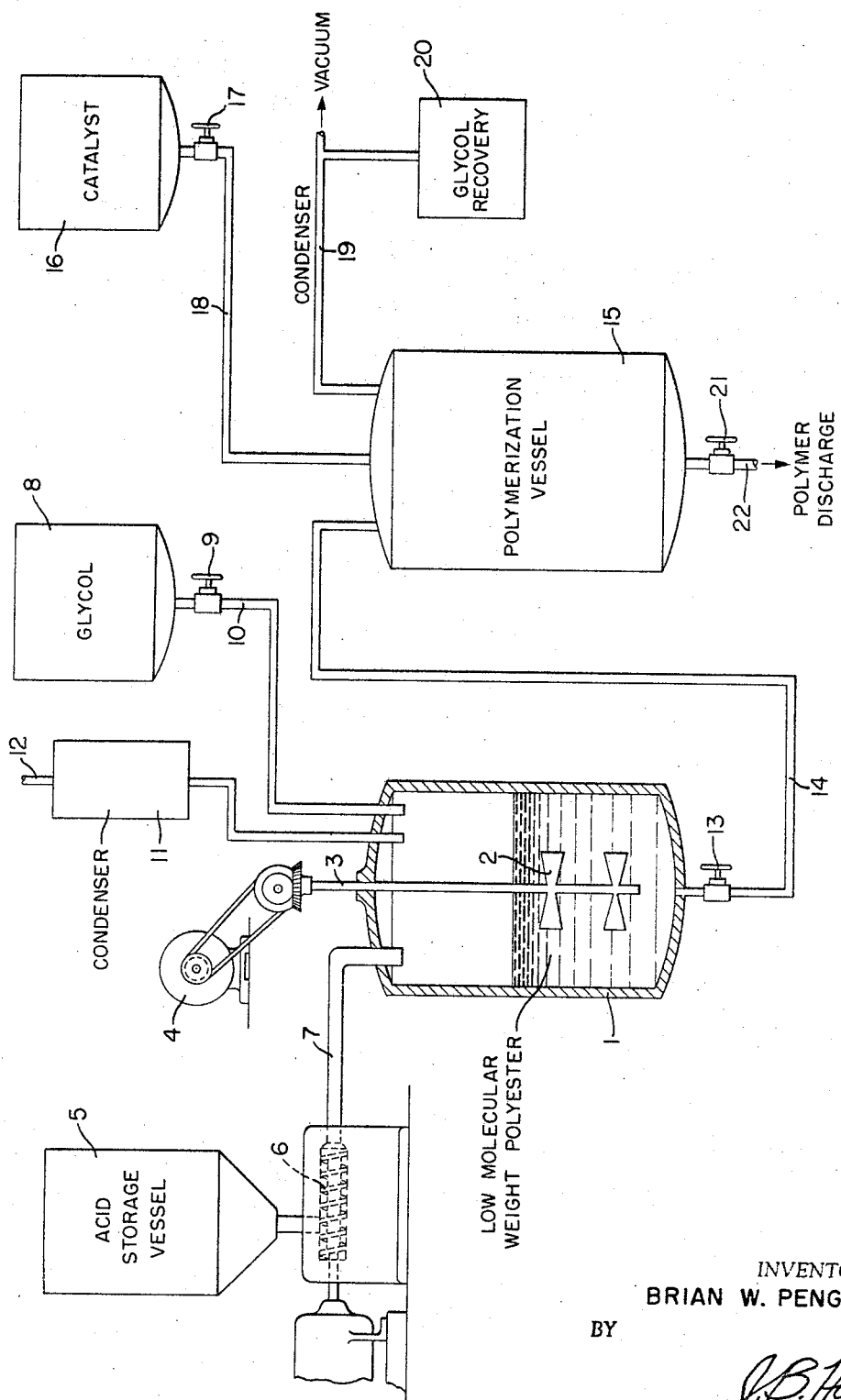
INVENTOR.
BRIAN W. PENGILLY
BY
J.B. Holden
ATTORNEY 3,427,287
METHOD FOR PREPARING POLYESTER RESINS
Brian W. Pengilly, Stow, Ohio, assignor to The Goodyear Tire & Rubber Company, Akron, Ohio, a corporation of Ohio
Continuation of application Ser. No. 134,936, Aug. 30, 1961. This application June 30, 1966, Ser. No. 561,950
U.S. Cl. 260—75    4 Claims
Int. Cl. C08g *17/003, 17/08*

This application is a continuation of pending application Ser. No. 134,936 filed Aug. 30, 1961, now abandoned.

This invention relates to an improved process for preparing linear polyesters. More particularly, the invention relates to a process which can be operated as a batch process or a continuous process to produce high molecular weight linear polyesters of high quality.

High molecular weight linear polyesters are presently produced on a commercial scale by the ester interchange process. For example, in the production of highly polymeric linear polyethylene terephthalate the dimethyl esters of terephthalic acid are heated with an excess of ethylene glycol in the presence of an ester interchange catalyst at a temperature of about 185 to 200° C. at atmospheric pressure until approximately the theoretical amount of methyl alcohol has been liberated. The excess glycol is then distilled off and the product remaining, which is the bis glycol ester, is polymerized by condensation reaction with the elimination of glycol by heating the bis glycol ester with a catalyst at elevated temperatures and under reduced pressures until a high molecular weight product is formed.

Polymeric ethylene terephthalate can be produced by heating terephthalic acid with ethylene glycol to form the diglycol ester which can then be polymerized by heating in the presence of a catalyst under reduced pressures to form a high molecular weight product. This process, however, has not been successful on a commercial scale because the esterification of terephthalic acid with ethylene glycol requires extended times of heating at elevated temperatures and also requires the use of a large excess of glycol. It has been attempted to produce polyethylene terephthalate by reacting ethylene glycol with terephthalic acid under superatmospheric pressure at elevated temperatures but this process suffers from the disadvantage that some of the glycol is converted into polyethers and other products and in addition a large excess of glycol must be used. Polyethers are known to contribute to color and to instability of high molecular weight linear polyethylene terephthalate.

It is an object of the present invention to provide an improved process for producing linear polyesters. It is another object of the invention to provide a process for producing linear polyesters starting with free dicarboxylic acids and free glycol as reactants. It is another object to provide a continuous process for producing highly polymeric linear polyesters. Still another object of the invention is to provide a process in which only a minimum amount of catalyst is used and the high molecular weight linear polyester resin produced contains only a small amount of catalyst residue. Other objects will appear hereinafter as the description of the invention proceeds.

According to the invention, linear polyesters are produced by reacting a free dicarboxylic acid with a glycol in a solvent which is a low molecular weight linear polyester to produce a low molecular weight linear polyester product having an average degree of polymerization of from 3 to 20. This low molecular weight polymer can then be polymerized by condensation reaction. The process can be advantageously operated as a continuous process by continuously adding free dicarboxylic acid and glycol to molten low molecular weight linear polyester resin, reacting them and continuously withdrawing an amount of low molecular weight polyester resin equal to the acid and glycol added. High molecular weight linear polyesters can be produced continuously by continuously adding free dicarboxylic acid and glycol to molten low molecular weight linear polyester resin and reacting them while continuously withdrawing low molecular weight resin and introducing the resin withdrawn into a polymerization apparatus and continuously polymerizing the resin to high molecular weight resin and withdrawing high molecular weight linear polyester resin from the polymerization apparatus.

The process of the invention is illustrated by the following examples.

Example 1

15.15 pounds of dimethyl terephthalate, 10.65 pounds of ethylene glycol and 1.54 grams of antimony catalyst and 2.62 grams of zinc acetate catalyst in 110 milliliters of ethylene glycol were placed in a 12-liter glass flask. The flask was equipped with a 4-foot distillation column, reflux condenser and a turbine-type impeller agitator. The mixture was stirred and heated to 150° C. and then the temperature was slowly raised to 220° C. at a rate such that methanol evolution was steady and uninterrupted. When the temperature of the mixture reached 220° C. the reaction was stopped.

Twenty-five grams of the material prepared above were placed in a small flask and heated to 250° C. Fifty grams of terephthalic acid were added. Forty-five minutes later 25 milliliters of ethylene glycol were added. One hour after the addition of the terephthalic acid the temperature of the mixture had again risen to 250° C. and all of the terephthalic acid had gone into solution. Then 100 grams of terephthalic acid were added. Forty-five minutes later 50 milliliters of ethylene glycol were added. In one hour all of the terephthalic acid had gone into solution. Again, an additional 100 grams of terephthalic acid were added and 45 minutes later 50 milliliters of ethylene glycol were added and the mixture reacted for 55 minutes. The product thus prepared was a low molecular weight polymeric ethylene terephthalate having a low degree of polymerization.

Example 2

Four hundred milliliters of molten low molecular weight polymeric ethylene terephthalate prepared in Example 1 were placed in a one-liter flask which was equipped with a stirrer, reflux condenser, and inlet ports for the addition of terephthalic acid and ethylene glycol. One hundred grams of terephthalic acid were added and the mixture was stirred and heated at 250° C. until it became clear. Approximately one hundred milliliters of the mixture was withdrawn from the flask and 100 grams of terephthalic acid and then 55 grams of ethylene glycol were added to the remainder in the flask. Heating and stirring were continued until the mixture again became clear. The process was repeated as follows:

| Time | | Amount of terephthalic acid added (grams) | Temp. of the melt, °C. | Ethylene glycol added (ml.) | Low molecular wt. polymer withdrawn, grams |
|---|---|---|---|---|---|
| Hours | Minutes | | | | |
|  |  | 100 |  |  |  |
|  | 30 |  |  | 50 | 114 |
|  | 33 |  |  |  |  |
|  | 45 | 100 | 220 |  |  |
| 1 | 15 |  |  | 50 |  |
| 1 | 20 |  |  |  | 122 |
| 1 | 45 | 100 | 210 |  |  |
| 2 | 15 |  |  | 50 |  |
| 2 | 20 |  |  |  | 155 |
| 2 | 35 | 100 | 250 |  |  |
| 3 | 05 |  |  | 40 |  |
| 3 | 10 |  |  |  | 118 |
| 3 | 25 | 100 | 250 |  |  |
| 3 | 55 |  |  | 40 |  |
| 4 | 0 |  |  |  | 123 |

Example 3

The procedure of Example 2 was repeated using as starting melt 400 milliliters of low polymeric ethylene terephthalate.

| Time | | Amount of Terephthalic Acid Added (Grams) | Amount Glycol Added (ml.) | Temp. (C.) | Low Molecular Weight Polymer Withdrawn |
|---|---|---|---|---|---|
| Hours | Minutes | | | | |
| 0 | 0 | 200 |  | 205 |  |
| 0 | 14 |  | (1) | 229 |  |
| 0 | 59 |  | 70 | 228 |  |
| 1 | 07 |  |  | 230 | 280 |
| 1 | 10 | 200 |  | 210 |  |
| 1 | 24 |  | (1) | 230 |  |
| 2 | 17 |  | 71 | 228 |  |
| 2 | 21 |  |  | 230 | 280 |
| 2 | 32 | 200 |  | 192 |  |
| 2 | 56 |  | (1) | 226 |  |
| 3 | 56 |  | 70 | 226 |  |
| 3 | 59 |  |  | 230 | 280 |
| 4 | 06 | 200 |  | 220 |  |
| 4 | 15 |  | (1) | 220 |  |
| 5 | 35 |  | 70 | 222 |  |
| 5 | 48 |  |  | 230 | 280 |

[1] Addition started.

In the above example the molar ratio of terephthalic acid to ethylene glycol was 1:1.05. The average degree of polymerization for the low molecular weight product was 20, i.e., the average molecular of polyester in the product contained twenty acid-glycol units

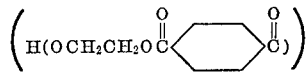

bonded together in the chain and terminated by glycol thus having the average structure

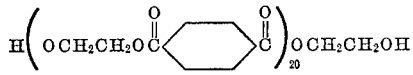

The preparation of the low molecular weight polymer was repeated using various temperatures for the esterification reaction. A fifty-gram sample of low molecular weight polyethylene terephthalate prepared in each of the examples was converted to high molecular weight polyester by the following procedure:

50 grams of low molecular weight polymer, 0.015 gram zinc acetate dihydrate and 0.015 gram antimony trioxide were added to a 500 milliliter reactor tube equipped with stirring paddle and vacuum take-off. The mixture was heated at 275° C. for 45 minutes at 0.1 millimeters of mercury pressure. The color of the high molecular weight polymers was rated compared to a standard and the intrinsic viscosities were determined in the usual way by measuring the viscosity of a known solution of the polyester in a 1.5:1 phenol:tetrachloroethane mixed solvent at 30.0° C.

TABLE 1

| Example Number | Temperature, °C. used for Esterification to form Low Molecular Weight Polymer | Polymer Color [1] | Polymer Intrinsic Viscosity |
|---|---|---|---|
| 3 | 210 | 1.5 | 0.748 |
| 4 | 220 | 1.5 | 0.658 |
| 5 | 230 | 1.5 | 0.690 |
| 6 | 240 | 1.5+ | 0.695 |
| 7 | 250 | 1.0+ | 0.614 |
| 8 | 260 | 3.0 | 0.711 |

[1] Color estimated as compared with standards of solutions of Pontamine Catechu 3 G dye in water at the following concentrations:

| Color rating: | Mg. dye per 100 mls. water |
|---|---|
| 1 | 0.250 |
| 2 | 0.500 |
| 3 | 0.750 |

The data of Table 1 show that high molecular weight products are obtained from the low molecular weight polymer produced at various temperatures.

Example 4

In another experiment 25 pounds of a 90/10 dimethyl terephthalate/dimethyl isophthalate mixture was reacted with 17.8 pounds of ethylene glycol in the presence of 0.03% zinc acetate and 0.0023% polymeric ethylene glycol titanate as co-catalysts. To the resulting bis-hydroxyethyl terephthalate there was added 4.1 milliliters triphenyl phosphate. Polymerization was effected by heating the mixture at 256° C. and 0.5 millimeter of mercury pressure. After 4¼ hours polycondensation under these conditions, a polymer with intrinsic viscosity 0.621 was obtained. In a control experiment in which no triphenyl phosphate was added a polymer having an intrinsic viscosity of 0.65 was obtained in 2 hours and 10 minutes.

This illustrates the pronounced retarding effect that phosphorus stabilizers have upon ester-interchange-type polymerization reactions. In contrast to this, phosphorus stabilizers have little effect on polymerization reactions in which the first stage material is made by esterification-type reaction as is shown by the following example.

Example 5

Fifty grams of low polymeric ethylene terephthalate prepared as described in Example 2, 0.015 gram antimony trioxide and 0.015 gram tritolyl phosphate in 0.8 milliliter diphenyl ether were placed in a small reactor tube which was equipped with a stirrer and a vacuum take-off. The mixture was heated and stirred for 30 minutes at 250° C. at atmospheric pressure. The pressure in the reaction tube was reduced to 1 millimeter of mercury pressure and the temperature raised to 275° C. After 1¼ hours a high polymer having an intrinsic viscosity of 0.648 was obtained. The polymer had a color of 2 as rated by comparison with the standard shown in Table 1.

An identical run was made using low polymeric ethylene terephthalate prepared as described in Example 2 without the addition of tritolyl phosphate. After 2 hours at 275° C./1 millimeter of mercury pressure, a polymer of intrinsic viscosity 0.531 was obtained. These examples show that the addition of a phosphorus stabilizer does not slow up the polymerization rate when the first-stage product is made according to the present invention but, in fact, increases it. This is contrary to results obtained when a phosphate is added in the preparation of polyester by the ester interchange method as shown in Example 4.

The process of the invention can be run continuously by operating as in Examples 1, 2 and 3 but in a continuous manner by adding reactants continuously instead of by increments and continuously removing low molecular weight polymer. This can be combined with a polymerization operation to provide an efficient, economical, continuous process for the manufacture of high molecular weight polyester suitable for the production of fibers and films. This is illustrated below.

Referring to the drawing, an apparatus for continuous operation of the process is shown. In operating continuously, to start the process, heated reaction vessel 1 is filled about one-third full with low molecular weight polyethylene terephthalate. Then this low molecular weight polymer is heated to a temperature of from 250 to 260° C. and slowly agitated by means of stirrer 2 attached to shaft 3 which is turned by motor 4. A storage vessel 5 is used to store a supply of terephthalic acid. Terephthalic acid is conducted from storage vessel 5 by means of a screw conveyor 6 through conduit 7 into the heated reaction vessel 1. A storage vessel 8 is used to hold ethylene glycol. Ethylene glycol is conducted from the storage vessel by means of control valve 9 through conduit 10 into heated reaction vessel 1. The terephthalic acid and ethylene glycol are run in continuously and simultaneously in approximately stoichiometric proportions. Water released in the esterification reaction is vaporized. Water vapor together with ethylene glycol vapors pass into reflux condenser 11 where the ethylene glycol is condensed and returned to the reaction vessel 1. Water vapor is drawn off through line 12 at the top of condenser 11 and discarded. Low molecular weight polyester is formed and is withdrawn from heated reaction vessel 1 at about the same rate that the reactants are introduced into heated reaction vessel 1 by means of control valve 13 through conduit 14 and conducted to polymerization vessel 15 in which the low molecular weight polyester resin is passed in at one end, polymerized while passing through the reactor and the high molecular weight resin formed is removed from the other end. Polymerization catalyst, stored in storage vessel 16, is continuously conducted through control valve 17 through conduit 18 into polymerization vessel 15. Water vapor and glycol released in the polymerization reaction are withdrawn from the polymerization vessel through condenser 19 and passed to glycol recovery unit 20 where the glycol is recovered. The polymerization vessel is operated under reduced pressure produced by a vacuum system, not shown, which is connected to condenser 19. High molecular weight polyester resin is removed from the polymerization reaction vessel through valve 21 and conduit 22 and sent to another station not shown where it may be stored or processed into fiber, film, or other products.

The invention has been illustrated particularly with respect to the use of terephthalic acid and ethylene glycol as reactants. It can also be used to prepare polyesters from other acids and other glycols. For example, instead of terephthalic acid, other acids can be used. Representative examples of such acids are isophthalic acid, orthophthalic acid, 2,6-naphthoic acid, hexahydroterephthalic acid, p,p'-diphenyl dicarboxylic acid, adipic acid, sebacic acid, etc.

The invention is applicable to the preparation of linear glycol terephthalate polyesters and linear copolyesters of terephthalic acid with other dicarboxylic acids and other glycols. Representative examples of such acids are aromatic dicarboxylic acids such as isophthalic acid, orthophthalic acid, and p,p'-diphenyl dicarboxylic acid; cycloaliphatic dicarboxylic acids such as tetrahydroterephthalic acid; and aliphatic dicarboxylic acids such as oxalic acid, succinic acid, adipic acid, sebacic acid, etc. The invention can be used to prepare copolyesters such as terephthalate copolyesters and particularly copolyesters containing terephthalic acid as a major portion of the total acid component, i.e., those copolyesters containing from 90 to 60 mol percent of terephthalic acid based on the total acid component, the remainder of the acid component being one or more of the acids from the above-mentioned acids or other similar dicarboxylic acid.

The invention is especially suitable for the preparation of the ethylene terephthalate-ethylene isophthalate copolyesters containing terephthalic acid as a major portion of the acid component such as the 90/10, 80/20, 70/30 and 60/40 copolyesters, i.e., those copolyesters containing from 90 to 60 mol percent of terephthalic acid based on the total acid component and from 10 to 40 mol percent of isophthalic acid based on the total acid component.

The invention was illustrated particularly with respect to the use of ethylene glycol. Polyesters of other glycols can also be similarly prepared. Representative examples of such glycols are the polymethylene glycols having from 2 to 10 methylene groups such as ethylene glycol, propylene glycol, tetra methylene glycol, hexamethylene glycol, and decamethylene glycol, the cyclohexane diols, cyclohexane dimethanol, di-beta-hydroxy ethoxy benzene, and 2,2-bis[4(beta hydroxyethoxy)phenyl] propane and similar varieties of glycols.

The process can be operated over a wide range of temperatures. The temperature used for the esterification reaction should be at least as high as the melting temperature of the low molecular weight polyester resin but should not be so high that a large amount of glycol is distilled out of the reacting mixture to the reflux condenser. Thus, the temperature can be suitably from about 150 to 300° C., depending on the melting temperature of the low polymer, and is preferably operated in the range of from 220 to 260° C. At higher temperatures the ratio of acid to glycol is generally higher than the ratio of acid to glycol used at lower temperatures. The ratio of dicarboxylic acid to glycol used will be in the range of from about 1:1.05 to 1:1.3. When terephthalic acid is used as a reactant and the process is operated at about 250° C. the ratio of terephthalic acid to glycol can be 1 to 1.05 and satisfactory results obtained. At a temperature of about 230° C. the ratio of terephthalic acid to glycol used will suitably be about 1 to 1.3 to secure reasonably fast reaction rates.

The process can be carried out by charging the reaction vessel with the mixture of glycol and acid together with the low molecular weight polyester resin and heating the mixture until the low molecular weight resin melts and reacting the materials. However, it is preferred to operate the process by first melting the low molecular resin and then passing in the acid and glycol and reacting them. The process can be operated as a batch process or as a continuous process. For efficiency and economy of operation it is preferred to operate it as a continuous process.

The low molecular weight linear polyester initially used as the solvent is a linear polyester having an average degree of polymerization in the same range as that of the low polymer product prepared. It can have the same degree of polymerization as the final product or it can have a different degree of polymerization—that is—it can have a lighter or lower degree of polymerization because the degree of polymerization of the final product is regulated by the amounts and ratios of acid to glycol added to the system.

The average degree of polymerization for both the initial low molecular weight polyester and the low molecular weight product produced is in the range of from 3 to 20 and preferably from 10 to 20. The polyester molecules have the general structure.

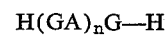

wherein H is hydrogen; G is a glycol unit or residue; A is a dicarboxylic acid unit or residue, and $n$ is an integer from 3 to 20. Thus, the low molecular weight polyester resin has a number average molecular weight of from about 600 to about 4,000. When this resin is polymerized either by batch process or continuous process in the presence of a polymerization catalyst to form a high polymer, the product is a highly polymeric linear polyester resin having an intrinsic viscosity of at least 0.40, generally in the range of from 0.50 to 1.20.

The initial low molecular weight linear polyester can be prepared by polymerizing the bis glycol ester, by depolymerizing, a high molecular weight polyester in the presence of glycol, or by any other suitable method.

It was shown above that the invention provides an efficient continuous process for the production of high molecular weight linear polyester resin, i.e., resin having an intrinsic viscosity of at least 0.40, generally above 0.50. The procedure and conditions for the preparation of the low molecular weight resin produced in the first stage are illustrated above. The condensation or polymerization reaction for the preparation of the high molecular weight resin from the low molecular weight resin is carried out at elevated temperature under reduced pressure in the presence of a suitable polymerization catalyst in accordance with the usual known techniques. Thus, the reaction is preferably carried out in the absence of oxygen, generally in an atmosphere of an inert gas such as nitrogen or the like. It is carried out under reduced pressure, generally below 10 millimeters of mercury pressure and usually at or below 1 millimeter of mercury pressure at a temperature in the range of from 260 to 290° C., although other pressures and temperatures can be used, according to known practice.

The process of the present invention has many advantages, both technical and economical. The free acids are less expensive than dialkyl esters of acids so considerable savings can be made by using the free acid where the prior art processes use the dialkyl esters. There is no by-product of lower alkyl alcohol and since the excess of glycol used is kept at a minimum, recovery and losses of glycol are considerably reduced. Reaction rates are rapid and complete reaction from raw material to high polymer may be carried out in as little as three hours. Furthermore, polyesters formed by this method have intrinsic viscosities which are somewhat higher than those normally obtained by the ester interchange route. In addition to these advantages, the polyester product may contain much less catalyst residue than polyester resin formed by the ester interchange process. No catalyst is needed in the initial esterification reaction although catalysts such as zinc acetate, manganous acetate, and alkali metal alcoholates may be employed if desired. The only catalyst actually necessary is a polymerization or condensation catalyst which may suitably be a material such as antimony trioxide, zinc borate, litharge, lead acetate, magnesium oxide, or other condensation catalyst. In addition, stabilizers such as phosphates and phosphites can be added during the process without any adverse effect on the polymerization reaction which is contrary to the effect of such materials when they are used in the ester interchange method.

While certain representative embodiments and details have been shown for the purpose of illustrating the invention, it will be apparent to those skilled in this art that various changes and modifications may be made therein without departing from the spirit or scope of the invention.

What I claim is:

1. The method which comprises continuously adding terephthalic acid and ethylene glycol in the ratio of 1:1.05 to 1:1.3 of terephthalic acid to ethylene glycol to low molecular weight ethylene glycol terephthalate polyester having a degree of polymerization of from 3 to 20 while heating at a temperature above the melting temperature of the low molecular weight polyester but below the distillation temperature of the glycol from said mixture to form a low molecular weight polyester having a degree of polymerization of from 3 to 20 and continuously withdrawing an amount of the low molecular weight polyester formed about equal to the amount of terephthalic acid and ethylene glycol added.

2. The method of preparing a highly polymeric linear polyester which comprises adding (a) at least one acid selected from the group consisting of terephthalic acid and isophthalic acid and (b) ethylene glycol in the mol ratio of acid to glycol of from 1:1.05 to 1:1.3 to a low molecular weight linear polyester resin derived from at least one acid selected from the group consisting of terephthalic acid and isophthalic acid and ethylene glycol, said resin having a degree of polymerization in the range of from 3 to 20, heating and reacting the mixture at a temperature in the range of from the melting temperature of the low molecular weight linear polyester to the temperature at which glycol distills from the mixture at atmospheric pressure and then heating and reacting the mixture at a temperature of from about 265° C. to 280° C. at a pressure of about 1 millimeter of mercury in the presence of a catalyst until a high molecular weight linear polyester having an intrinsic viscosity of at least 0.4 is formed.

3. The method of claim 2 in which a mixture of terephthalic acid and isophthalic acid is used in which the terephthalic acid comprises 90% of the mixture and isophthalic acid comprises 10% of the mixture.

4. The method which comprises continuously adding terephthalic acid and ethylene glycol in the ratio of 1:1.05 to 1:1.3 of terephthalic acid to ethylene glycol to low molecular weight ethylene glycol terephthalate polyester having a degree of polymerization of from 3 to 20 while heating it at a temperature above the melting temperature of the low molecular weight polyester but below the distillation temperature of the glycol from said mixture, continuously withdrawing an amount of the low molecular weight polyester formed about equal to the amount of terephthalic acid and ethylene glycol added and polymerizing it in the presence of a catalyst at a temperature of from 260° C. to 290° C. at a pressure below 10 millimeters of mercury pressure to form a high molecular weight linear polyester having an intrinsic viscosity of at least 0.4.

References Cited
UNITED STATES PATENTS

| | | | |
|---|---|---|---|
| 2,465,319 | 3/1949 | Whinfield et al. | 260—75 |
| 3,028,366 | 4/1962 | Engle et al. | 260—75 |
| 3,060,152 | 10/1962 | Ringwald | 260—75 |
| 3,196,131 | 7/1965 | Mayer et al. | 260—75 |

OTHER REFERENCES

Bjorksten, Polyesters & Their Applications, Rheinhold, N.Y., 1956, p. 35.

Oronite Chemical Co., Processing of Isopolyester Resins, 1960, p. 1.

DONALD E. CZAJA, *Primary Examiner.*

M. J. WELSH, *Assistant Examiner.*

U.S. Cl. X.R.

260—45.7